United States Patent
Browne et al.

(10) Patent No.: US 11,761,560 B2
(45) Date of Patent: Sep. 19, 2023

(54) MODULAR PIPE RACK SYSTEM

(71) Applicant: ConXtech, Inc., Pleasanton, CA (US)

(72) Inventors: Adam Leighton Browne, El Sobrante, CA (US); John S. Boyd, Tiburon, CA (US); Brian Hood, San Francisco, CA (US)

(73) Assignee: ConXtech, Inc., Pleasanton, CA (US)

( * ) Notice: Subject to any disclaimer, the term of this patent is extended or adjusted under 35 U.S.C. 154(b) by 0 days.

(21) Appl. No.: 17/180,714

(22) Filed: Feb. 19, 2021

(65) Prior Publication Data

US 2021/0254757 A1    Aug. 19, 2021

Related U.S. Application Data

(60) Provisional application No. 62/978,742, filed on Feb. 19, 2020.

(51) Int. Cl.
*F16L 3/23* (2006.01)
*F16L 3/24* (2006.01)

(52) U.S. Cl.
CPC ............... *F16L 3/23* (2013.01); *F16L 3/245* (2019.08)

(58) Field of Classification Search
CPC ..... F16L 3/23; F16L 3/245; F16L 3/26; F16L 3/00; F16L 3/22; H02G 3/0456; H02G 3/0437; F16B 7/0473
See application file for complete search history.

(56) References Cited

U.S. PATENT DOCUMENTS

| | | | |
|---|---|---|---|
| 835,059 A | 11/1906 | Curley et al. |
| 925,677 A | 6/1909 | Belcher |
| 1,110,185 A | 9/1914 | Brown et al. |
| 1,285,946 A | 11/1918 | Colt |
| 1,367,044 A | 2/1921 | Hausler et al. |
| 1,400,066 A | 12/1921 | Huck |
| 1,471,094 A | 10/1923 | Bloss |
| 1,729,743 A | 10/1929 | Jorgensen et al. |
| 2,008,087 A | 7/1935 | Stromberg |
| 2,569,653 A | 10/1951 | Boedecker |

(Continued)

FOREIGN PATENT DOCUMENTS

| CN | 109537724 A | * 3/2019 | ........... E04B 1/2403 |
|---|---|---|---|
| CN | 109537726 A | * 3/2019 | ........... E04B 1/2403 |

(Continued)

OTHER PUBLICATIONS

ConX® Modular Pipe Rack System Catalog dated: 2015, 26 pages (Year: 2015).*

(Continued)

*Primary Examiner* — Terrell L McKinnon
*Assistant Examiner* — Ding Y Tan
(74) *Attorney, Agent, or Firm* — Kolisch Hartwell, P.C.

(57) ABSTRACT

An apparatus for supporting one or more pipes is disclosed. The apparatus includes a first tower, a second tower, and each tower includes four vertical columns, and a first set of horizontal beams. Each beam is configured to span and connect two of the vertical columns via biaxial moment connecting collars. The towers are aligned to support a first pipe on beams from both towers along a primary pipe support axis, and none of the columns in the first tower is connected to a column of the second tower by a biaxial moment connecting collar.

17 Claims, 12 Drawing Sheets

(56) References Cited

U.S. PATENT DOCUMENTS

| | | | |
|---|---|---|---|
| 2,833,503 A | 5/1958 | Harshbarger et al. |
| 2,897,013 A | 7/1959 | Delp |
| 3,071,205 A | 1/1963 | Beck, Jr. |
| 3,148,477 A | 9/1964 | Bjorn et al. |
| 3,266,208 A | 9/1966 | Maggs et al. |
| 3,270,997 A | 9/1966 | Gethmann |
| 3,392,801 A | 7/1968 | Gethmann |
| 3,396,499 A | 8/1968 | Biffani |
| 3,401,739 A | 9/1968 | Opletal |
| 3,410,044 A | 11/1968 | Moog |
| 3,533,592 A | 10/1970 | Jennings |
| 3,562,988 A | 2/1971 | Gregoire |
| 3,564,803 A | 2/1971 | Breeze et al. |
| 3,685,866 A | 2/1972 | Patenaude |
| 3,664,011 A | 5/1972 | Labastrou |
| 3,684,058 A | 8/1972 | Brown |
| 3,706,169 A | 12/1972 | Rensch |
| 3,784,151 A | 1/1974 | Steele |
| 3,829,999 A | 8/1974 | Bernstein |
| 3,977,801 A | 8/1976 | Murphy |
| 3,978,994 A | 9/1976 | Woolslayer et al. |
| 4,019,298 A | 4/1977 | Johnson, IV |
| 4,059,931 A | 11/1977 | Mongan |
| 4,306,397 A | 12/1981 | Ramseyer |
| 4,347,028 A | 8/1982 | Dugan |
| 4,360,230 A | 11/1982 | Wood et al. |
| 4,372,425 A | 2/1983 | Murphy |
| 4,438,607 A | 3/1984 | Nelson |
| 4,522,001 A | 6/1985 | Meyer |
| 4,577,449 A | 3/1986 | Celli |
| 4,684,285 A | 8/1987 | Cable |
| 4,736,554 A | 4/1988 | Tyler |
| 4,742,665 A | 5/1988 | Baierl |
| 4,754,712 A | 7/1988 | Olson et al. |
| 4,821,844 A | 4/1989 | Huffman et al. |
| 4,830,144 A | 5/1989 | Werner |
| 4,852,501 A | 8/1989 | Olson et al. |
| 4,905,436 A | 3/1990 | Matsuo et al. |
| 5,061,111 A | 10/1991 | Hosokawa |
| 5,135,077 A | 8/1992 | Shalders |
| 5,156,235 A | 10/1992 | Preston |
| 5,240,089 A | 8/1993 | Spera |
| 5,244,300 A | 9/1993 | Perreira et al. |
| 5,289,665 A | 3/1994 | Higgins |
| 5,342,138 A | 8/1994 | Saito et al. |
| 5,536,117 A * | 7/1996 | Frame | E02B 17/027 |
| | | | 405/202 |
| 5,590,974 A | 1/1997 | Yang |
| 5,605,410 A | 2/1997 | Pantev |
| 5,615,529 A | 4/1997 | Johnson et al. |
| 5,617,931 A | 4/1997 | Zygmun et al. |
| 5,678,375 A | 10/1997 | Joula |
| 6,082,070 A | 7/2000 | Jen |
| 6,092,347 A | 7/2000 | Hou |
| 6,106,186 A | 8/2000 | Taipale et al. |
| 6,219,989 B1 | 4/2001 | Tumura |
| 6,390,719 B1 | 5/2002 | Chan |
| 6,554,102 B2 | 4/2003 | Schworer |
| 6,651,393 B2 | 11/2003 | Don et al. |
| 6,802,169 B2 * | 10/2004 | Simmons | E04B 1/24 |
| | | | 52/648.1 |
| 6,837,016 B2 | 1/2005 | Simmons et al. |
| 6,913,422 B2 | 7/2005 | Rogers |
| 7,021,020 B2 * | 4/2006 | Simmons | F16B 9/09 |
| | | | 52/696 |
| 7,032,712 B2 | 4/2006 | Schworer |
| 7,082,694 B2 | 8/2006 | Lyman, Jr. |
| 7,469,485 B1 | 12/2008 | Perdue |
| 7,470,081 B2 | 12/2008 | Miyahara et al. |
| 7,637,076 B2 | 12/2009 | Vaughn |
| D611,166 S | 3/2010 | Hammer |
| 7,677,522 B2 | 3/2010 | Bakos |
| 7,941,985 B2 * | 5/2011 | Simmons | E04B 1/24 |
| | | | 52/655.1 |
| 8,011,150 B2 | 9/2011 | Luttrell et al. |
| 8,056,299 B2 | 11/2011 | Liskey |
| 8,132,774 B1 | 3/2012 | Whatcott |
| 8,136,460 B2 | 3/2012 | Tait et al. |
| 8,161,698 B2 | 4/2012 | Migliore |
| 8,161,707 B2 | 4/2012 | Simmons |
| 8,297,002 B2 | 10/2012 | Fernandez Fernandez |
| 8,297,887 B2 | 10/2012 | Ness et al. |
| 8,453,414 B2 | 6/2013 | Simmons |
| 8,522,507 B2 | 9/2013 | Asada et al. |
| 8,528,298 B2 | 9/2013 | Semaan et al. |
| 8,627,615 B2 | 1/2014 | Moyher |
| 8,646,232 B2 | 2/2014 | Liskey |
| 8,745,954 B2 | 6/2014 | Simmons |
| 8,782,994 B1 | 7/2014 | Simmons |
| 8,789,279 B2 | 7/2014 | Samons et al. |
| 8,905,160 B1 | 12/2014 | Verzilli et al. |
| 9,032,677 B1 * | 5/2015 | Zavitz | A47B 57/12 |
| | | | 52/294 |
| 9,103,132 B2 | 8/2015 | Simmons et al. |
| 9,109,874 B2 * | 8/2015 | Simmons | E04G 13/021 |
| 9,291,288 B2 | 3/2016 | Simmons et al. |
| 9,341,304 B2 | 5/2016 | Osiecki et al. |
| 9,732,886 B2 | 8/2017 | Simmons et al. |
| 9,803,380 B2 | 10/2017 | Simmons et al. |
| 2002/0043038 A1 | 4/2002 | Cerrato |
| 2003/0041549 A1 | 3/2003 | Simmons et al. |
| 2003/0178253 A1 | 9/2003 | Tatge et al. |
| 2004/0237439 A1 | 12/2004 | Powell |
| 2005/0055954 A1 | 3/2005 | Simmons |
| 2005/0066612 A1 | 3/2005 | Simmons |
| 2007/0092358 A1 | 4/2007 | Innes et al. |
| 2007/0256391 A1 | 11/2007 | Mifsud et al. |
| 2008/0245023 A1 | 10/2008 | Simmons |
| 2009/0052980 A1 | 2/2009 | Williams |
| 2012/0110947 A1 | 5/2012 | Simmons |
| 2012/0160137 A1 | 6/2012 | Linares |
| 2012/0292131 A1 | 11/2012 | Lovas |
| 2013/0211795 A1 | 8/2013 | Vanker et al. |
| 2013/0319796 A1 | 12/2013 | Davis |
| 2014/0202795 A1 * | 7/2014 | Simmons | E04G 5/14 |
| | | | 182/129 |
| 2016/0032580 A1 | 2/2016 | Rahimzadeh et al. |
| 2016/0076269 A1 | 3/2016 | Foldenauer et al. |
| 2018/0094420 A1 * | 4/2018 | Houghton | E04H 9/021 |
| 2018/0125231 A1 * | 5/2018 | Reyes | A47B 47/027 |
| 2018/0245329 A1 * | 8/2018 | Yu | E04B 1/5812 |
| 2019/0249409 A1 * | 8/2019 | Boyd | E04B 1/2403 |
| 2019/0249709 A1 | 8/2019 | Smith et al. |

FOREIGN PATENT DOCUMENTS

| | | | | |
|---|---|---|---|---|
| CN | 110306658 A * | 10/2019 | | E04B 1/2403 |
| CN | 209585270 U * | 11/2019 | | E04B 1/2403 |
| DE | 2758992 A1 | 7/1979 | | |
| DE | 102009050139 A1 | 4/2011 | | |
| GB | 2261651 A | 5/1993 | | |
| KR | 20160108750 A * | 9/2016 | | |
| KR | 101899515 B1 * | 9/2018 | | |
| WO | 2011047830 A1 | 4/2011 | | |
| WO | WO-2018026342 A1 * | 2/2018 | | A47B 47/00 |
| WO | WO-2019110770 A1 * | 6/2019 | | E04H 5/02 |

OTHER PUBLICATIONS

Conxtech portable tower 2012 youtube video dated Feb. 3, 2012, weblink https://www.youtube.com/watch?v=wuBVIL7Mdck (Year: 2012).*

"The portable tower" 2014 youtube video produced by Victoria Raiser dated Jul. 9, 2014, weblink: https://www.youtube.com/watch?v=IGIP0Ev2XTs (Year: 2014).*

Conxtech ConX® modular pipe rack 2015 catalog, 26 pages (Year: 2015).*

NEHRP Seismic Design Technical Brief No. 2, "Seismic Design of Steel Special Moment Frames: A Guide for Practicing Engineers" publication date: Jun. 2009 by Ronald Hamburger et al. (publication series No. GCR 9-917-3), (Year: 2009).*

ConXtech. 'ConX Modular Pipe Rack' [online]. Jan. 6, 2013.

(56) References Cited

OTHER PUBLICATIONS

Retrieved from the internet: <http://www.conxtech.com/conx-system/conx-modular-pipe-rack/>; p. 1, figure 1, paragraphs 1, 2; p. 2, paragraph 1. 3pp.
ConXtech Brochure. 'CONX Modular Pipe Rack' [online]. Apr. 16, 2014. Retrieved from the internet: <http://www.conxtech.com_wp-content_uploads_files_documents_ConX_Modular_Pipe_Rack_Brochure.pdf>; entire document. 25pp.
U.S. Receiving Office of WIPO, International Search Report and Written Opinion of the International Searching Authority regarding PCT Patent Application No. PCT/US21/18931, 18 pages.
The International Bureau of WIPO, International Preliminary Report on Patentability regarding PCT Patent Application No. PCT/US2021/018931, dated Sep. 1, 2022, 8 pages.

\* cited by examiner

MODULAR PIPE RACK SYSTEM

CROSS-REFERENCES

This application claims the benefit under 35 U.S.C. § 119(e) of the priority of U.S. Provisional Patent Application Ser. No. 62/978,742, filed Feb. 19, 2020, the entirety of which is hereby incorporated by reference for all purposes. The following related applications and materials are also incorporated by reference herein, in their entireties, for all purposes: U.S. Pat. Nos. 7,021,020, 7,941,985, 6,802,169, 9,803,380, 9,291,288, 9,109,874, and U.S. Pub No. 2019/0249409.

INTRODUCTION

Many industries require transport of fluid through pipes. Transport paths may be highly customized, and vary in length from a few meters to many miles. The transported fluid may take the form of liquid or gas, and may vary widely in temperature, density, and volume.

Typically, it is preferable to support a pipe network above ground. There is a need for pipe support structures that are highly customizable, cost efficient to manufacture and assemble, easy to erect either permanently or temporarily, and are structurally strong enough to support pipes of diverse sizes and fluidic flow volumes, through varying outdoor natural conditions including extreme temperatures, high winds, and seismic events.

SUMMARY

The present disclosure provides systems, apparatus, and methods relating to fluid transport systems. In some embodiments, an apparatus for supporting one or more pipes, may include multiple modular towers, for example, a first tower, and a second tower. Each tower may include four vertical corner columns, and a first set of horizontal beams. Each beam may span and connect two of the vertical columns via biaxial moment connecting collars. The towers may be aligned to support a first pipe on beams from both towers along a primary pipe support axis, with none of the columns in the first tower being connected to a column of the second tower by a biaxial moment connecting collar. Each of the modular towers is independently self-supporting.

In some embodiments, an apparatus for supporting one or more pipes, may include a first tower, and a second tower. Each tower may include four vertical columns connected by a closed horizontal beam assembly via biaxial moment connection collars. The closed beam assembly may form a first pipe support tier along a primary pipe support axis spanning both of the first and second towers, with none of the columns in the first tower being connected to a column of the second tower by a biaxial moment connecting collar.

In some embodiments, a fluid transport system, may include a series of towers stationed along a transport path. Each tower may include four tubular columns, and a first rectangular closed beam assembly connected to the columns via biaxial moment connection devices. Each tower is independently self-supporting so that adjacent towers do not share beams connected by biaxial moment connection devices, and are capable of cooperatively supporting a continuous pipe passing through the towers along the transport path, and fastened to the first rectangular closed beam assemblies of the towers.

DETAILED DESCRIPTION

Figure 1:
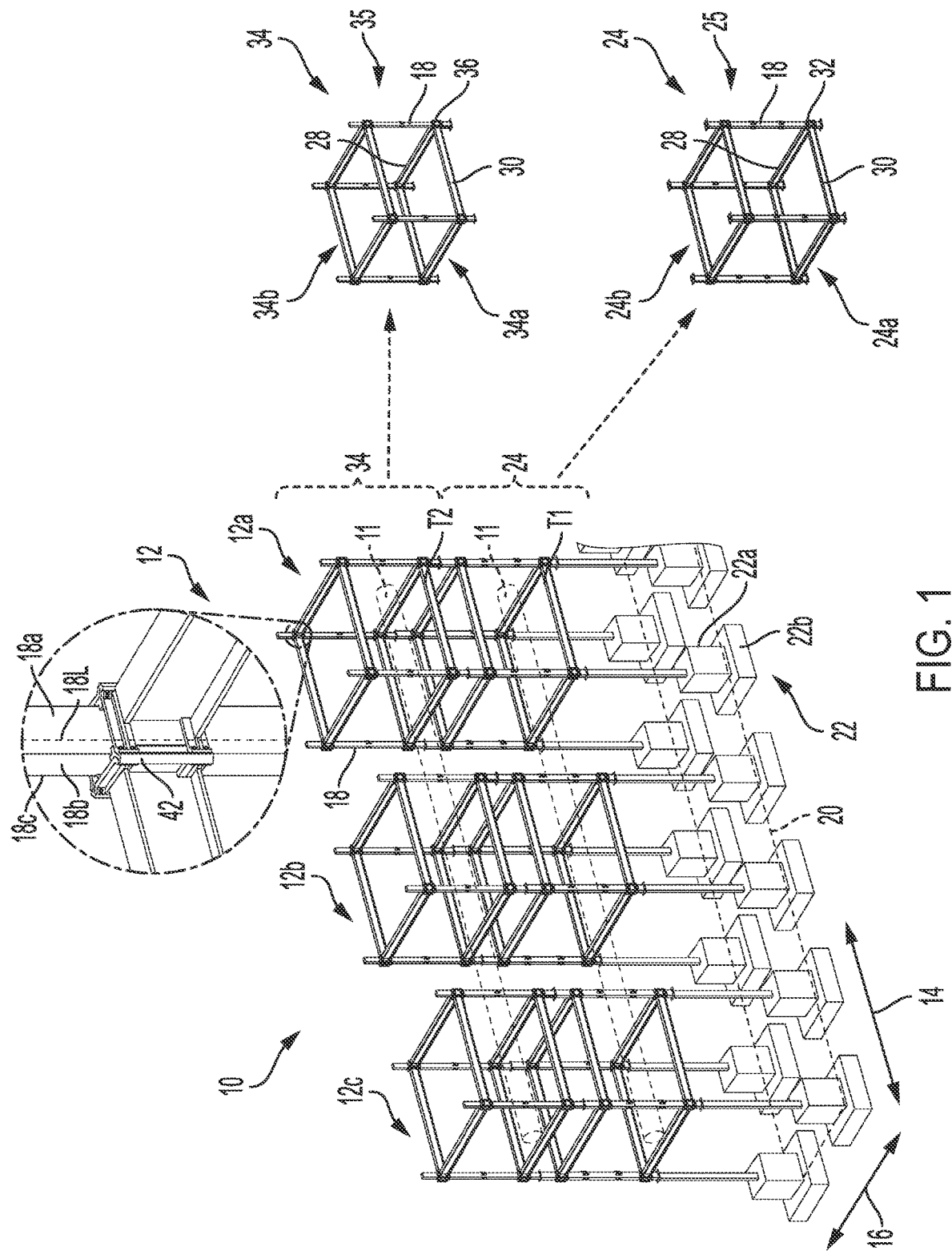
FIG. 1 is an isometric view of a fluid transport system, including a series of tower structures.

Various aspects and examples of fluid transport systems for supporting a plurality of fluid transport pipes, as well as related apparatus and methods, are described below and illustrated in the associated drawings. Unless otherwise specified, such an apparatus and/or its various components may, but are not required to, contain at least one of the structures, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A, and B, each of which is labeled accordingly.

Overview

In general, an apparatus or system for supporting pipes includes two or more individual self-supporting tower structures stationed along a fluid transport path on a ground surface. Each tower includes four vertical corner columns, sets of horizontal beams, and each beam spanning, and connecting two of the vertical columns via biaxial full moment corner connections, and forming one or more pipe support tiers. The towers are aligned to support pipes on the pipe support tiers from both the towers along the fluid transport path. The tower structures are free-standing, and none of the columns in adjacent towers are connected by biaxial moment connections.

Each column includes a pair of inner, and outer end faces. The inner, and outer end faces may also be described as tower-connecting, and tower non-connecting end faces, respectively. The corner connection at each corner node may include a corner collar structure circumferentially surrounding the vertical column. The corner collar structure may include components welded to the inner, and outer end faces of the columns. The welded components are configured for receiving beam end connecting, and beam end non-connecting assemblies. At one end, the beam end connecting assemblies are configured to be received in welded components on the inner faces of the vertical column, and at the other end to connect to longitudinal or transverse horizontal beams. The beam end non-connecting assemblies, which may also be described as terminal ends, are configured to include necessary elements to support the full moment collar connection but not connect to longitudinal or transverse horizontal beams. Additionally, each corner column may also include shear connection structures provided on the inner and outer faces for supporting additional, optional pipe supporting structures.

Examples, Components, and Alternatives

The following sections describe selected aspects of an exemplary fluid transport system as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Apparatus for Fluid Transport

As shown in FIGS. 1-9, this section describes an illustrative apparatus 10.

Apparatus 10 is an example of a fluid transport system, as described above. FIG. 1 shows an illustrative apparatus 10 for supporting one or more pipes 11. Apparatus 10 includes two or more individual tower structures 12 stationed along a longitudinal path or axis 14. Additional tower structures may be stationed along a transverse path or axis 16, to branch out in a direction orthogonal to, or in any other direction from, longitudinal axis 14. In the example illustrated in FIG. 1, three individual towers 12a, 12b, and 12c are stationed along longitudinal axis 14 to support pipes 11 of various sizes and dimensions to transport fluids over ground.

Each tower structure or module 12 includes four tubular vertical columns or corner columns 18, and each vertical column 18 is erected along an axis 18L orthogonal to longitudinal and transverse axes 14, 16, on a ground surface or foundation 20. Each vertical column includes a first pair of, generally planar opposite sides, or faces 18a, 18a', joined through four corners 18c to a second pair of generally planar opposite sides, or faces 18b, 18b'. In the example illustrated in FIG. 1, vertical columns 18 have a square cross-section, and first pair of faces 18a,18a' orthogonally intersect second pair of faces 18b, 18b' through corners 18c. First pair of next-adjacent faces 18a, 18b may be referred to as inner faces or tower connecting end faces, and second pair of next-adjacent faces 18a', 18b' may be referred to as outer faces or tower non-connecting or terminal end faces.

Each vertical column 18 is effectively anchored to ground surface 20 by appropriately distributed and positioned footings, or pedestals 22. Footings for a given tower may be placed at equivalent elevations, for example, pursuant to teachings in U.S. Pat. No. 9,109,874, hereby incorporated by reference. Alternatively, for placing a tower on uneven ground, stub or spacer columns of varying heights may be mounted on the footings to support four identical corner columns 18 for a given tower 12.

An upper portion 22a of each footing is configured to receive a lower end of corresponding vertical corner column 18. A lower portion 22b of each footing is configured to be received in ground surface 20, so that upper portion 22a of footing 22 is flush relative to ground surface 20. In the example illustrated in FIG. 1, footings 22 are arranged to provide a square cross section for tower structure 12. In other examples, other cross-sectional shapes for tower structure 12 may be contemplated as well. Alternatively, lower end of vertical column 18 may be embedded in any suitable concrete foundation.

In the depicted example, the tower structure 12 includes a first or lower section 24 and a second or upper section 34. Typically, second section 34 is spaced apart vertically from first section 24. Alternatively, tower structure 12 may include only first or second sections 24, 34 or may include a plurality of sections 24, 34 in various combinations.

First section 24 may be assembled from first sets of horizontal beams 24a, 24b and corresponding inner faces 18a, 18b of four vertical columns 18. As will be seen later in FIGS. 2, and 3, each set of horizontal beams H1, H2 includes pairs of transverse beams 28a, 28c, and longitudinal beams 30a, 30c. First sets of horizontal beams 24a, 24b may also be referred to as first and second closed beam assemblies, respectively. First closed beam assembly 24a is vertically spaced apart from second closed beam assembly 24b. In the present example, first closed beam assembly 24a is at least 5M above ground surface 20 and second closed beam assembly 24b is at least 4M above first closed beam assembly 24a. In other examples, first section 24 may include three or more beam assemblies spaced apart vertically from one another.

First section 24 may also be described as a first cuboidal framework 25. Each corner or vertex of cuboidal framework 25 represents a first corner node or dead-end node or node 32 between one of transverse beams 28, one of longitudinal beams 30, and inner faces 18a, 18b of one of vertical columns 18. As will be discussed in detail later, each node 32 may include a moment connection 33 between inner faces 18a, 18b of vertical column 18 and transverse and longitudinal beams 28, 30. In an example, both transverse and longitudinal moment connections 33 may be biaxial moment connections such as is described in U.S. Pat. No. 7,941,985. Each edge of cuboidal framework 25 may represent one of transverse beams 28 or longitudinal beams 30. Each face of the cuboidal framework may be open to allow for supporting and passing of plurality of pipes 11. A base of first cuboidal framework 25 or first closed beam assembly 24a may be referred to as a first tier T1 of tower structure 12 for supporting a plurality of pipes 11.

Second section 34 may similarly be assembled from second sets of horizontal beams 34a, 34b, and corresponding inner faces 18a, 18b of four vertical columns 18. Second sets of horizontal beams 34a, 34b may also be referred to as third and fourth closed beam assemblies, respectively. Third closed beam assembly 34a is vertically spaced apart from fourth closed beam assembly 34b. In the present example, fourth closed beam assembly 34b is no more than 5M above the first section 24. In other examples first closed beam assembly 24a may be a first distance from a ground surface 20 and a highest closed beam assembly or fourth closed beam assembly 34b may be a second distance above first section 24, the first distance being approximately twice the second distance. First, second, third or fourth beam assemblies 24a, 24b, 34a, 34b may be spaced apart no more than the first distance. The first, second, third or fourth beam assemblies 24a, 24b, 34a, 34b may be spaced apart no more than the first distance or at least by half of the first distance. In other examples, second section 34 may include three or more beam assemblies spaced apart vertically from one another.

Second section 34 may also be described as a second cuboidal framework 35. Each corner or vertex of second cuboidal framework 35 represents a second corner node or dead-end node or node 36 between one of transverse beams 28, one of longitudinal beams 30, and one of the vertical columns 18. As will be discussed in detail later, each second node 36 may include moment connection 37 between corresponding inner faces 18a, 18b of vertical column 18, and transverse beam 28 or longitudinal beam 30. In an example, both transverse and longitudinal moment connections 37 may be biaxial moment connections, such as is described in U.S. Pat. Nos. 7,941,985 and 7,021,020, incorporated herein by reference. Each edge of second cuboidal framework 35 may be transverse beam 28 or longitudinal beam 30. Each face of second cuboidal framework 35 may be open to allow for supporting and passing of a plurality of pipes 11. A base of second cuboidal framework 35 or third closed beam assembly 34a may be referred to as a second tier T2 of tower structure 12 for supporting plurality of pipes 11.

Each of tower structures 12 may have a width of at least 4M along longitudinal or transverse axis 14, 16. Further, each tower 12 has a height and a spacing distance from an adjacent tower, the height of tower 12 being no more than approximately four times the spacing distance. A longitudinal dimension of each tower 12 may be approximately parallel to a transport path, and approximately equal to the spacing distance from adjacent tower 12. A transverse dimension of each tower 12, orthogonal to a longitudinal dimension, is between half and twice a longitudinal dimension.

Generally, fluid transport apparatus 10 has nodes that are fixed at 12" (300 mm) for the 8" column system, and the depth of the beam plus 7" for the other two systems. First node 32 is approximately 4M to 8M above the foundation. Highest node 32, 36 or 38 is preferably 6.5 ft (2M) to 13 ft (4M) from first closed beam assembly 24a. Intermediate nodes between a top node and a bottom node (if any) are preferably spaced no closer than 13 ft (4M) apart.

A height from a top of foundation 20 to a top of first closed beam assembly 24a is typically between 16 ft (5M) and 26 ft (8M). Subsequent beam assemblies may occur at 6 ft (2M) to 13 ft (4M) increments. Beam assemblies connected by moment connections are preferably spaced no closer than 13 ft (4M) and no further than 26 ft (8M) apart. The uppermost closed beam assembly 34b is preferably free of moment connections and no more than 16 ft (5M) above the penultimate closed beam assembly that has a moment connection 33 or 37. Most tower structures 12 are shorter than 80 ft (24M), and taller than 20 ft (6M). Tower structures 12 are mostly single or double bay wide, and single or double bay in length longitudinally. Each vertical column 18 has a column width and first, second, third and fourth beam assemblies 24a, 24b, 24a, 34b include an I-beam having a flange width and a beam depth. The flange width is less than or equal to the column width and the beam depth being greater than or equal to the column width.

Figure 2:
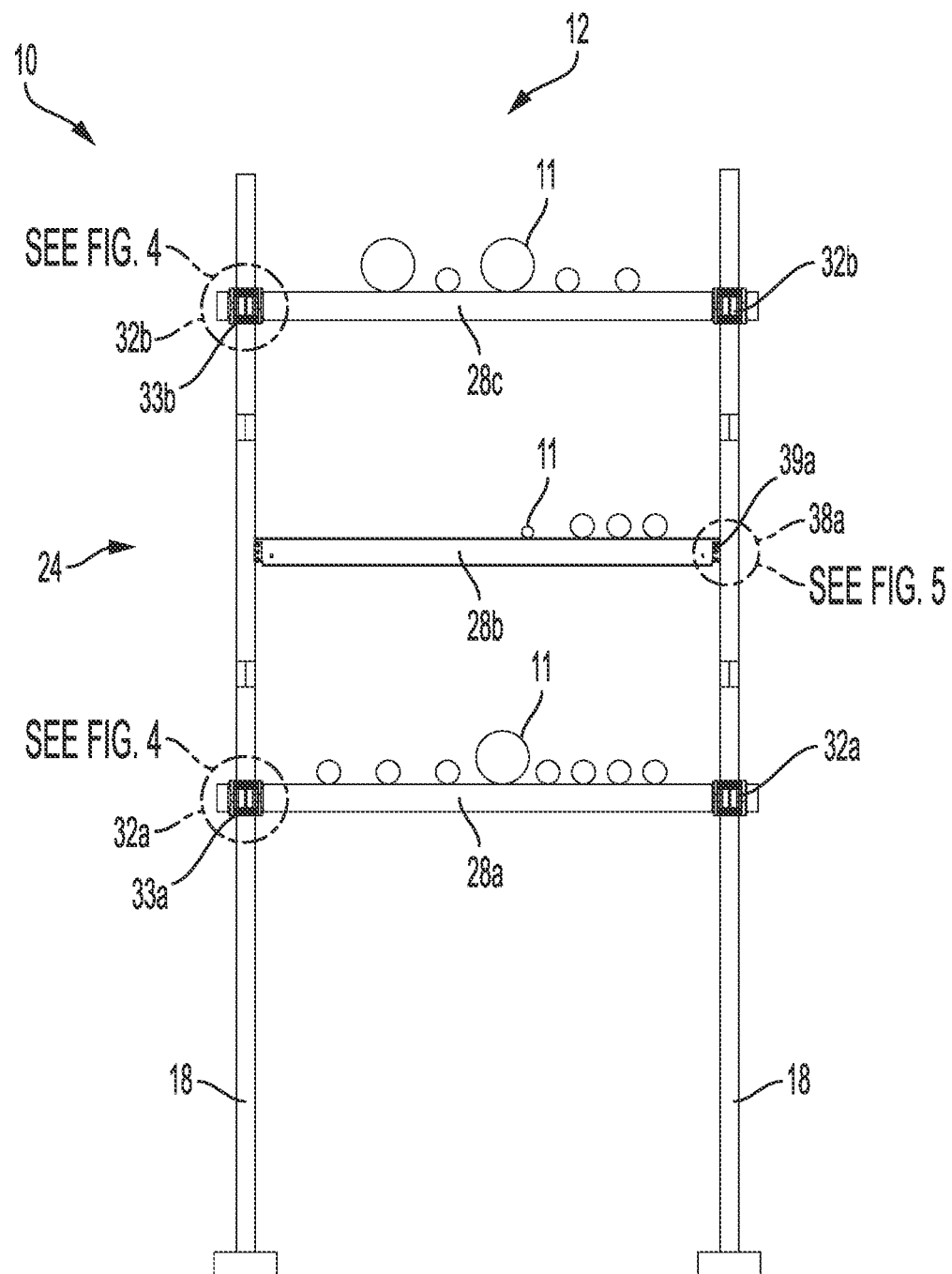
FIG. 2 is a partial side elevation view along a transverse axis of the fluid transport system of FIG. 1.

FIG. 2 is an exemplary side elevation along transverse axis 16 of a portion of the fluid transport apparatus 10 of FIG. 1, including section 24. As mentioned above, a pair of vertical columns 18 adjacent transverse axis 16 are connected to each other by transverse beams 28a and 28c through bolted moment connections 33a and 33b at nodes 32a and 32b. Additionally, the vertical columns 18 may be connected to one or more transverse beams, for example beam 28b at nodes 38a through shear connections 39a. Appropriate shear connections may include a catch structure such as is described in U.S. Pat. No. 6,802,169 or 8,161,707, incorporated herein by reference, and associated variations which fall under the scope of this disclosure. Each of beam assemblies formed at nodes 32a or 38a are configured to support a plurality of pipes 11 of various lengths, sizes, and diameters.

The transverse beam 28 may be a wide flange beam. For example, the vertical column 18 may be a square hollow structural section (HSS) column or a square box column. A square HSS may allow for a cantilever top column to support lightweight cable or flare lines. In some examples the vertical column may be a unitary piece, or may be assembled by connecting several segments. The square columns may be 8" (200 mm), 12" (300 mm), or 16" (400 mm) in cross-sectional diameter. A longitudinal span may be 20 ft (6M) and the transverse span may be between 13 ft (4M) and 33 ft (10M).

A transverse spacing between tower structures 12 may be dictated by pipe volume requirements. A strength of transverse or longitudinal beams 28, 30 may be proportional to a load supported and the length of transverse or longitudinal beam span. A lateral stiffness of tower 12 is proportional to the size and lengths of transverse or longitudinal beams 28, 30, and vertical columns 18. A longitudinal spacing is typically based on the span capabilities of the small diameter pipe and may be customized for each fluid transport system.

Figure 3:
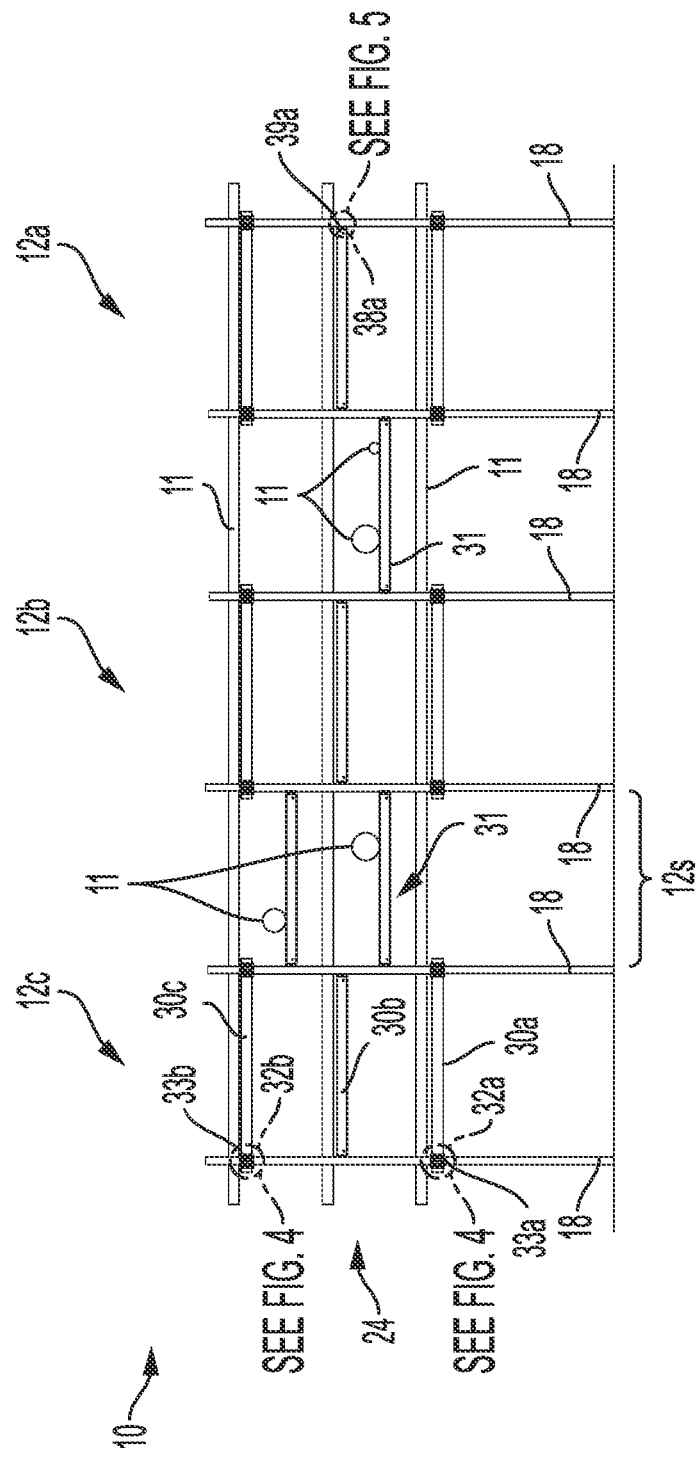
FIG. 3 is a partial side elevation view along a longitudinal axis of the fluid transport system of FIG. 1.

FIG. 3 is an exemplary side elevation along longitudinal axis 14 of a portion of the fluid transport apparatus 10 of FIG. 1, including section 24. As mentioned above, a pair of vertical columns 18 adjacent the longitudinal axis 14 are connected to each other by longitudinal beams 30a, 30c through moment connections 33a, 33b at nodes 32a, 32b. Additionally, vertical columns 18 may be connected to one or more longitudinal beams, for example longitudinal beam 30b at nodes 38a through shear or gravity catch connections 39a.

As seen in FIG. 3, each tower structure 12 is spaced apart from an adjacent tower structure by an inter tower bay spacing or interval spacing 12s. For example, the interval spacing may at least be 6M. Each tower structure 12 is free standing, self-supporting, and unconnected (by moment connections) from an adjacent tower structure. In other words, none of the vertical columns 18 in first tower 12a are connected to vertical a vertical column 18 of second tower 12b by a biaxial moment connection, the towers 12 being aligned to support a plurality of pipes on beams from adjacent towers 12a, 12b, 12c along longitudinal axis 14, also referred to as a primary pipe support axis.

In some other examples, as illustrated in FIG. 3, vertical columns of adjacent tower structures may be connected by strut beams 31 through shear connections. Preferably, the strut beams may include W-shaped beams. Typically, the strut beams may be connected at a mid-height of the first or second sections 24, 34 of the tower structures. In the depicted example, each tower structure 12 is spaced 20 ft (6M) longitudinally from an adjacent tower structure to be compatible with the spanning capabilities of small diameter pipes. The transverse spacing is most commonly 20 ft (6M), followed by 23 ft (7M), 26 ft (8M), and 33 ft (10M) with some instances of 13 ft (4M) on smaller systems.

Figure 4:
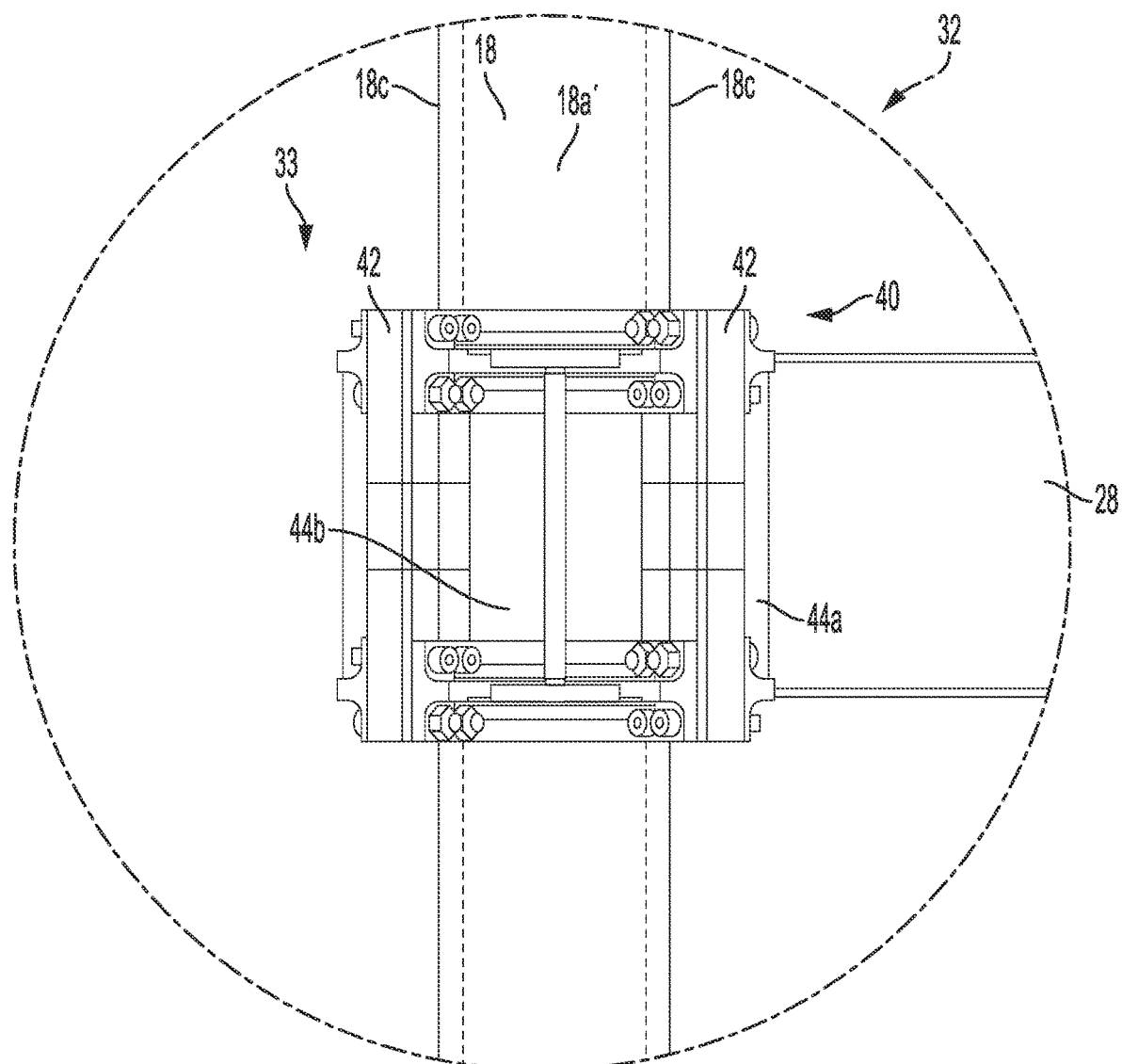
FIG. 4 is a side elevation view of a moment connection in the tower structure of FIG. 1.

FIG. 4 is an exemplary side elevation of a moment connection collar assembly 33 located at node 32 appropriate for building first section 24 of tower structure 12. As will be explained in detail later, each nodal connection 33 includes a first full moment collar 40 formed by connection components including (i) corner assemblies 42 which are attached directly by welding to corners 18c of columns 18, (b) beam-end connecting flange assemblies 44a which are attached by welding to the opposite ends of transverse and longitudinal beams 28, 30, and (c) beam-end non-connecting flange assemblies 44b which are configured to engage by corner assemblies 42, but are not connected to transverse or longitudinal beams. These three kinds of connection components are designed in such a fashion that, during assembly of tower structures 12, (i) after placement of next-adjacent vertical columns 18 at their proper pedestal locations 22, (ii) properly prepared end-readied transverse and longitudinal beams 28, 30 are simply lowered by gravity into place between pairs of next-adjacent vertical columns 18, whereby nodal-connection 33 provides for a gravity-locked, full-moment condition at a region of connection 33 with vertical column 18, and transverse and longitudinal beams 28, 30 to form first and second closed beam assemblies 24a, 24b.

Collar 40 may also be referred to as a corner collar or dead-end collar, which is configured to be connected to longitudinal or transverse beams only on two sides. Collar 40 connects longitudinal beam 28 and transverse beam 30 (not shown in FIG. 4) to vertical column 18 such that they are orthogonal to each other. In some examples, the transverse and longitudinal beams may be substantially orthogonal within some angular tolerance or may form other angles with the vertical column. Precise location and orientation of transverse and longitudinal beams 28, 30 with respect to vertical column 18 is achieved by engagement between components of collar 40.

Figure 5:
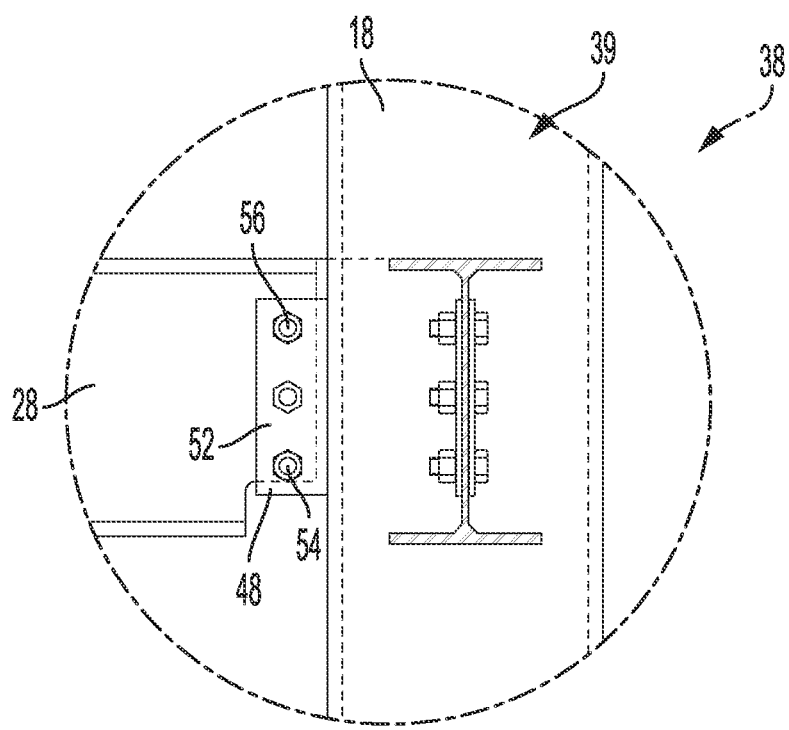
FIG. 5 is a side elevation view of a shear connection in the tower structure of FIG. 1.

FIG. 5 is a side elevation of a shear connection 39 located at node 38 appropriate for building intermediate tiers at any desired elevation in tower structure 12. Shear connection 39 includes a combination of gravity catch structures 48, and gravity-connected gravity hook 52 associated with removable attachment of transverse or longitudinal beams 28, 30 to vertical column 18. The gravity catch structure 48 takes the form of a pair of angle-iron members or brackets, with facing, spaced, parallel, angle-iron portions that define a generally planar, upright space (not shown in FIG. 5) for receiving a planar gravity hook structure 52. The lower end of space 48 is bridged by a gravity catch pin 54, and above pin 54 are two pairs of horizontally aligned through bores (disposed and hidden behind bolt heads, and not specifically numbered). The catch-structure bores are provided to accommodate nut-and-bolt assemblies 56. The bolt' lock gravity hook structure 52 in place relative to gravity catch structure 48. In FIG. 5, gravity catch 48 and gravity hook structure 52 are shown properly engaged, with the gravity hook structure seated by gravity downwardly over the gravity catch pin 54.

Figure 6B:
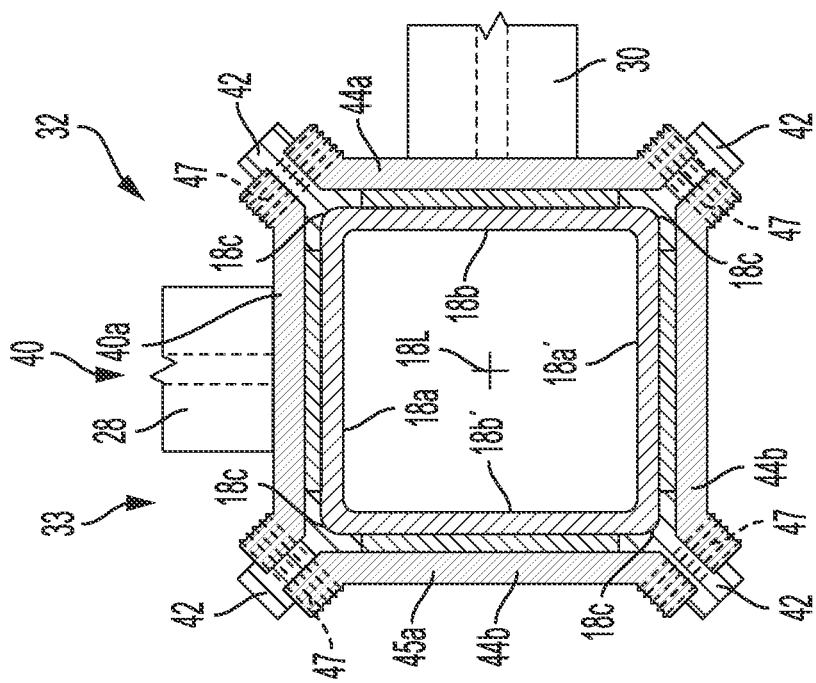
FIG. 6B is a fragmentary, cross-sectional view taken along a line 6B-6B in FIG. 6A.
Figure 6A:
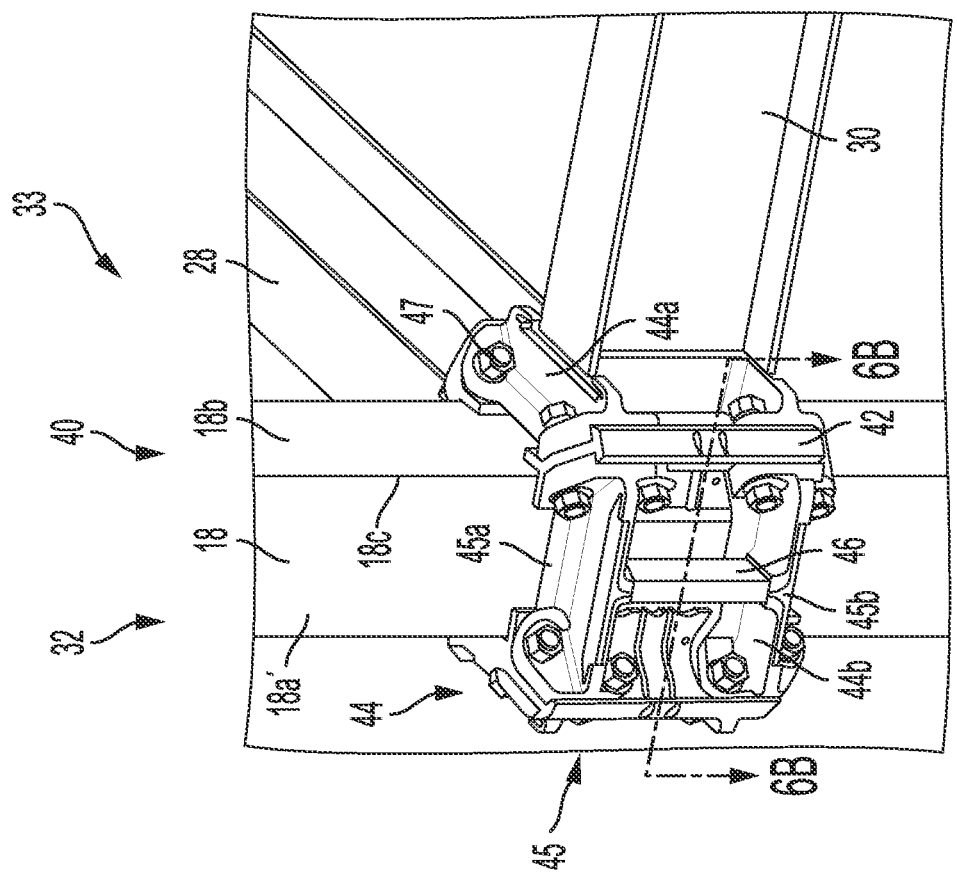
FIG. 6A is a perspective view of a node in the tower structure of FIG. 1.

FIG. 6A is a close-up perspective view of exemplary moment connection 33, including collar 40, located at corner node 32 of tower structure 12. As mentioned above, collar 40 includes equal numbers of corner assemblies 42, and flange assemblies 44. For example, collar 40 includes four corner assemblies 42, and four flange assemblies 44. Each corner assembly 42 is welded to a respective corner 18c of vertical column 18. Four flange assemblies 44 include a pair of beam end connecting flange assemblies 44a, and a pair of beam end non-connecting flange assemblies 44b. Beam end connecting flange assembly 44a is connected to corner assemblies 42 relative to beam end connecting face 18b of vertical column 18. Beam end non-connecting flange assembly 44b is connected to corner assemblies 42 relative to beam end non-connecting face 18a' of vertical column 18.

Corner assemblies 42 and flange assemblies 44 alternate, such that each corner assembly 42 engages a pair of beam end connecting flange assemblies 44a and beam end non-connecting flange assemblies 44b to form a full moment corner collar 40, and similarly each flange assembly 44 engages two corner assemblies 42, and each beam end connecting flange assembly 44a is welded to an end of one of transverse and/or longitudinal beams 28, 30.

Continuing with the description of each nodal connection 32, each beam-end connecting and non-connecting flange assembly 44a, 44b has fundamentally three elements, including an upper transverse element 45a, a similar, spaced lower transverse element 45b, and a centrally welded, intervening and interconnecting bridging element 46. The upper and lower transverse elements 45a, 45b collectively form what is referred to as a transverse component 45. A height of bridging element 46 may be directly dependent on dimensions of transverse and longitudinal beam 28, 30. Specifically, beam end non-connecting flange assembly 44b is configured not to connect to a transverse or longitudinal beam 28, 30, and thus forming corner node 32.

Turning attention to a cross-sectional view presented in FIG. 6B of nodal connection 33, four corner assemblies 42 which are anchored to vertical column 18 at corners 18c by welding. Each corner assembly extends angularly outwardly from the respective corner at an angle of 135-degrees with respect to the associated, two, intersecting column faces 12a, 12b Beam end connecting flange assemblies 44a and beam end non-connecting flange assemblies 44b are securely engaged with corner assembly 42 welded to vertical column 18, by fasteners or nut-bolt components 47 to provide for a connection node 32 a desired elevation along tower structures 12.

Figure 7B:
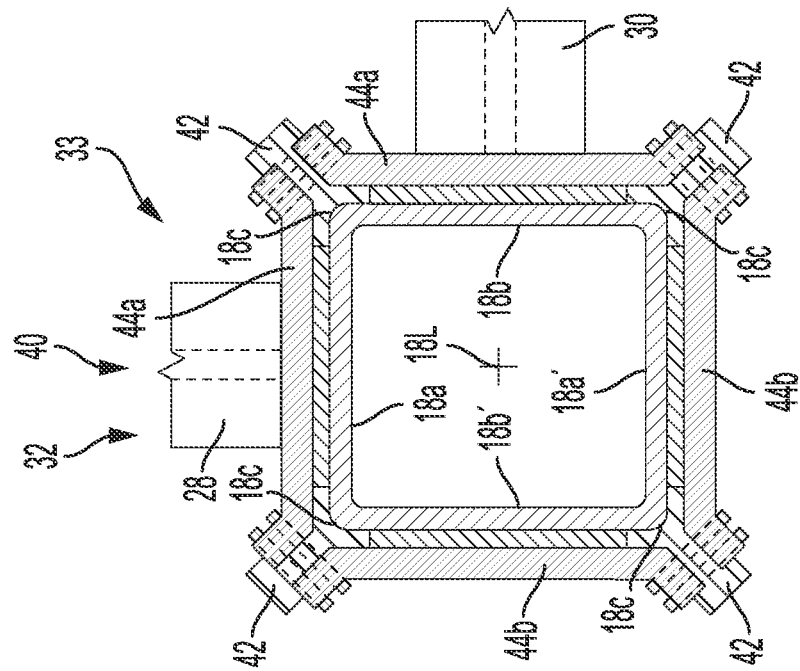
FIG. 7B is a fragmentary, cross-sectional view taken along a line 7B-7B in FIG. 7A.
Figure 7A:
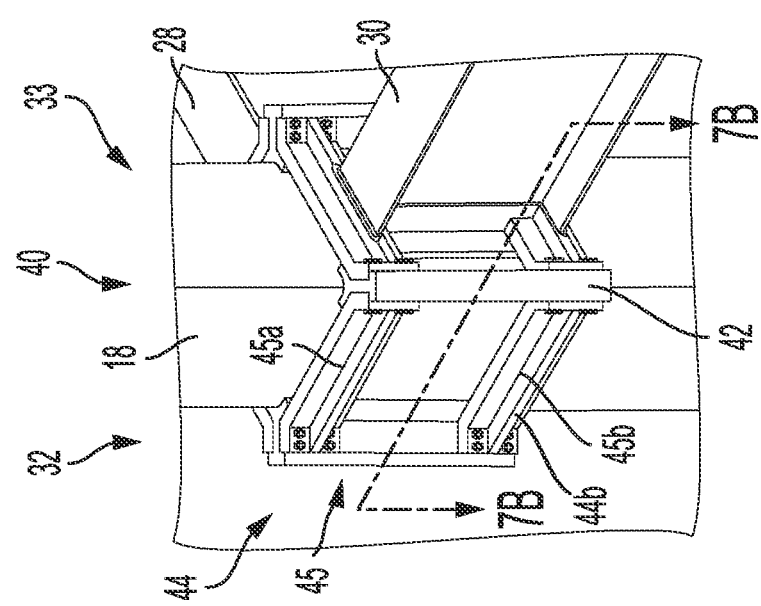
FIG. 7A is a perspective view of a node in the tower structure of FIG. 1.

FIG. 7A is a close-up perspective view of node 32, and including a modification of moment connection 33 described above in FIG. 6A-6B. While FIG. 6A illustrates a condition where a pair of beam end non-connecting assemblies 44b are utilized where transverse or longitudinal beams 28, 30 are not connected, it is also possible for the completion of a collar under these circumstances to be accomplished simply through the use of only one or more transverse elements, for example, such as transverse bars or 45a, 45b without the presence of any intervening bridging component 46. A fragmentary, cross-sectional view as shown in FIG. 7B illustrates formation of collar 40 by a combination of vertical column 18, four corner flanges 42, a pair of beam end connecting flange assemblies, and a pair of beam end non-connecting flange assemblies 44b without bridging component 45.

Figure 8B:
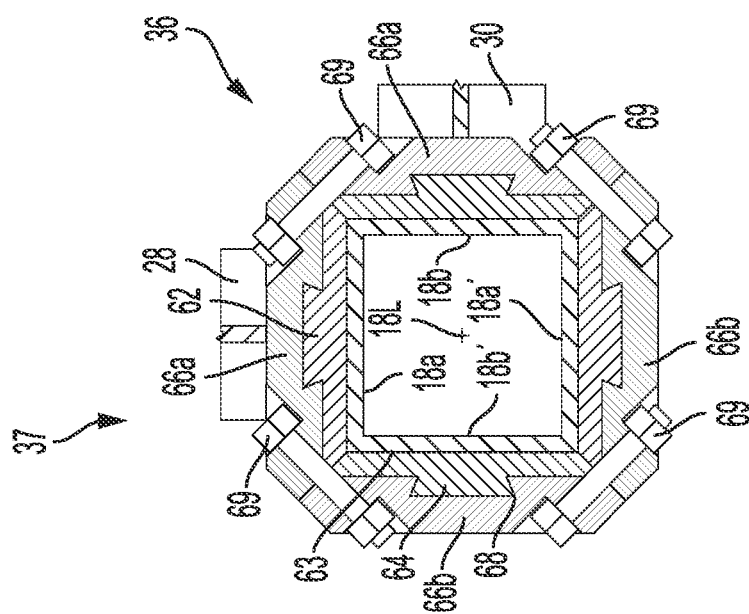
FIG. 8B is a fragmentary, cross-sectional view taken along a line 8B-8B in FIG. 8A.
Figure 8A:
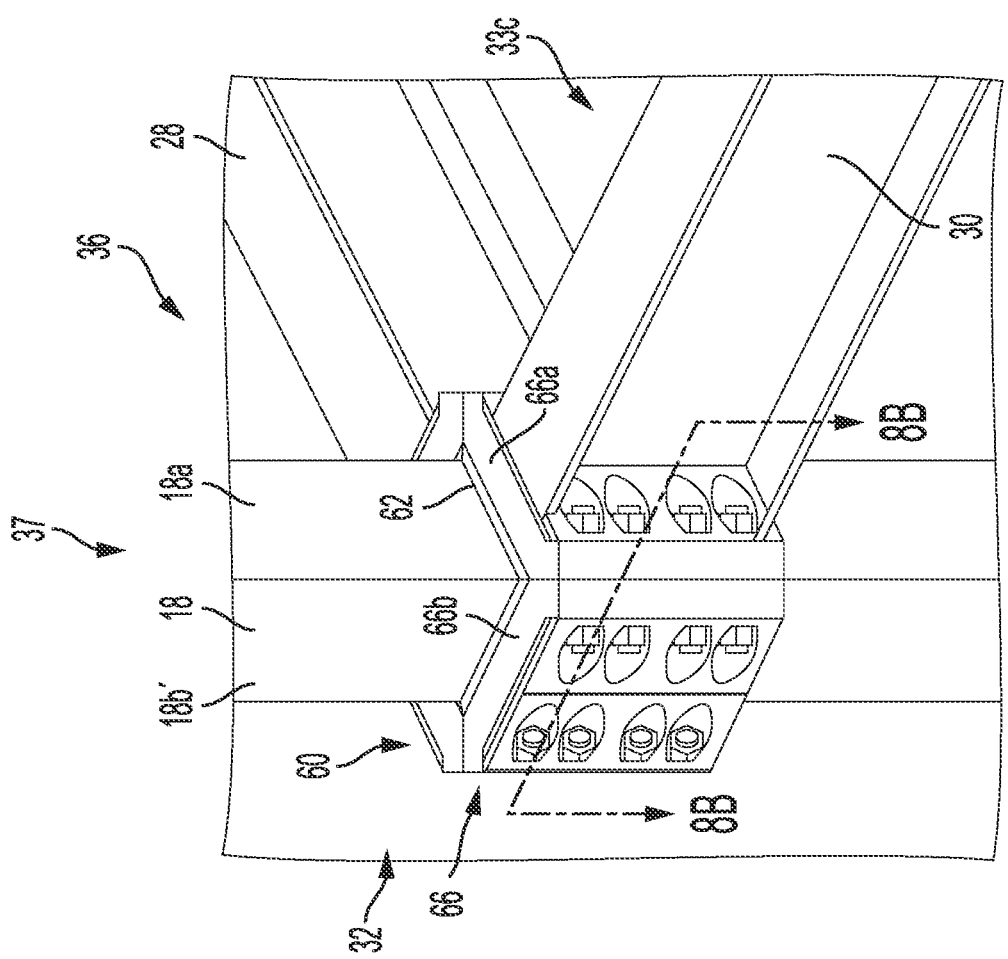
FIG. 8A is a perspective view of a node in the tower structure of FIG. 1.

FIG. 8A is a close-up perspective view of another exemplary biaxial full moment connection 37 located at second corner node 36, and appropriate for building modular pipe rack systems in accordance with the disclosure. Full moment connection 37 includes a full moment collar 60 formed by (i) inner collar components 62, which are anchored, for example by welding, to the side faces 18a, 18b, 18a', 18b' of vertical columns 18, (ii) outer collar beam connecting components 66a, which are made of components that are suitably anchored, for example by welding, to the opposite ends of transverse and longitudinal beams 28, 30, and (iii) outer collar beam non-connecting components 66b which are configured to be engaged with inner collar assemblies 62, but are not connected to transverse or longitudinal beams 28, 30. Inner and outer collar components 62, 66 are formed by precision casting and/or machining, and are also preferably pre-joined to columns and beams in an automated, factory-type setting, prior to shipping the components to the construction job site. Accordingly, inner and outer collar components 62, 66 lend themselves to economical, high-precision manufacture and assembly with vertical columns 18 and transverse and longitudinal beams 28, 30.

As seen in FIG. 8B inner collar components 62 include an upwardly tapered, wedge-shaped cleat structure 64 projecting from a planar plate-like structure 63. Outer collar components include an angular, wedge-shaped socket 68, which is sized to receive, snuggly and complementarily, previously mentioned cleat 64. Cleat-socket engagement between inner and outer collar components 62, 66 during construction of towers 12, enables gravity locking and positioning of the associated transverse and longitudinal beam components 28, 30, and establishes immediate, substantial stability and moment resistance to lateral loads, even without further assembly taking place at the nodal locations 36 of column-beam 18, 28, 30 intersections.

In general, biaxial full moment collar connections appropriate for building modular pipe rack systems in accordance with the disclosure may include connections 33, 37 located at corner nodes 32, 36 or any collar configured to circumferentially surround a vertical corner column 18, at a desired elevation from ground, and connect one or more horizontal beams, to form closed beam assemblies or pipe support tiers.

Figure 9:
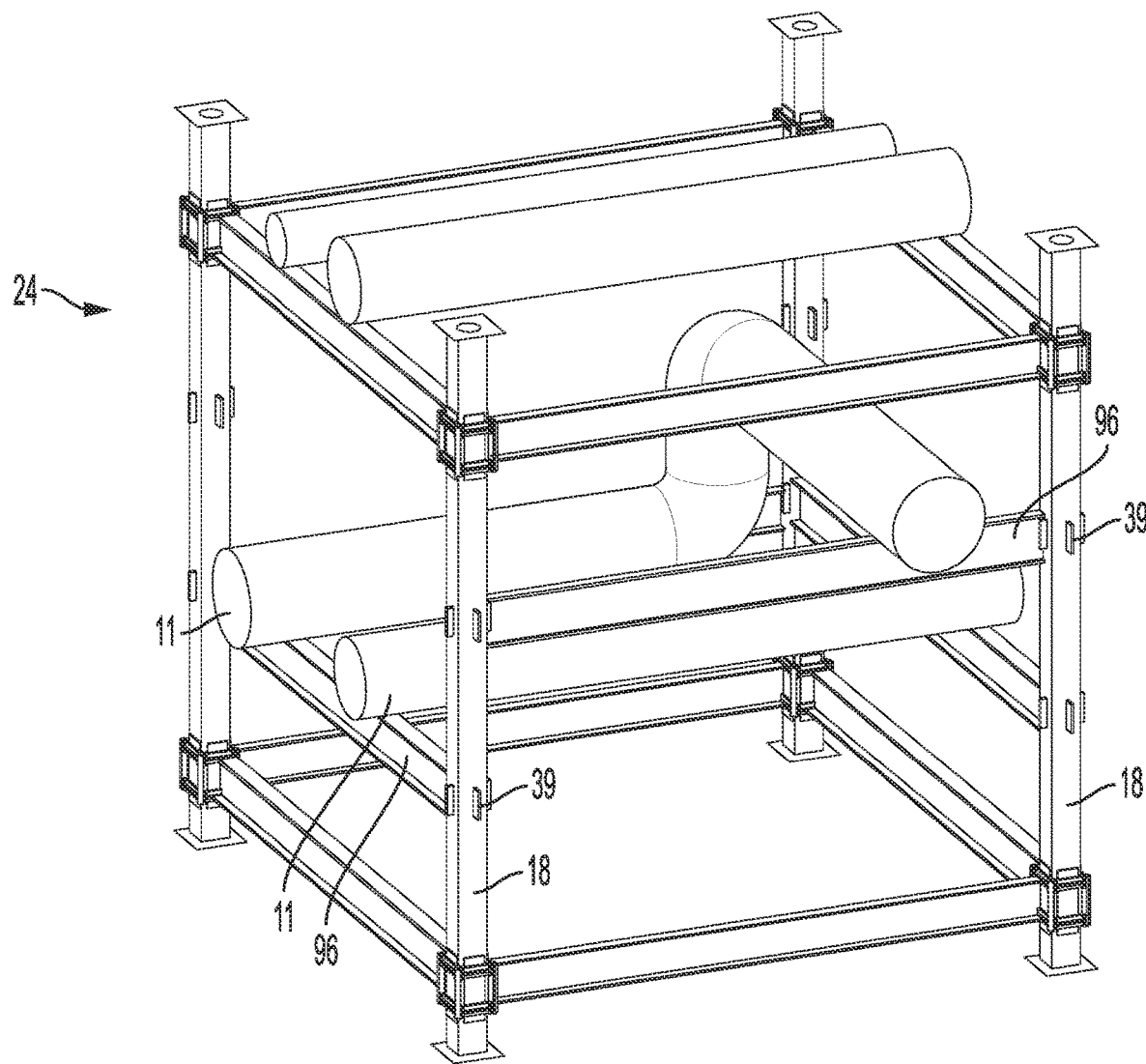
FIG. 9 is an isometric view of an exemplary tower structure.

As shown in FIG. 9, first section 24 of tower structure 12 may include auxiliary beams 96 attached between a pair of vertical columns 18 adjacent the transverse and/or longitudinal axes 14, 16 of fluid transport apparatus 10. In such examples, auxiliary beams 96 may be connected to vertical columns 18 by shear connections 39 and may be used as additional and intermediate tiers for supporting a plurality of pipes 11. In some examples, the auxiliary beams may support a turn-out of pipes 11.

For example, an 8" (200 mm) vertical column 18 based system may use only 12" (300 mm) nominal wide flange beams up to 8 inches wide. A 12" (300 mm) vertical column 18 based system may use 12" (300 mm) to 21" (533 mm) wide flange beams up to 10" (254 mm) wide. A 16" (400 mm) vertical column 18 based system may use 18" (457 mm) to 30" (762 mm) wide flange beams up to 12" (300 mm) wide. Transverse and longitudinal beam 28, 30 sizes used in fluid transport apparatus/systems may be determined by several criteria, including 1) strength to resist gravity, thermal, wind, and seismic loading, 2) limiting maximum lateral frame displacement due to thermal anchor and wind loading to specified maximum values, and 3) limiting a vertical deflection of transverse and longitudinal beams 28, 30 under gravity loading.

B. Illustrative System for Fluid Transport

Figure 10:
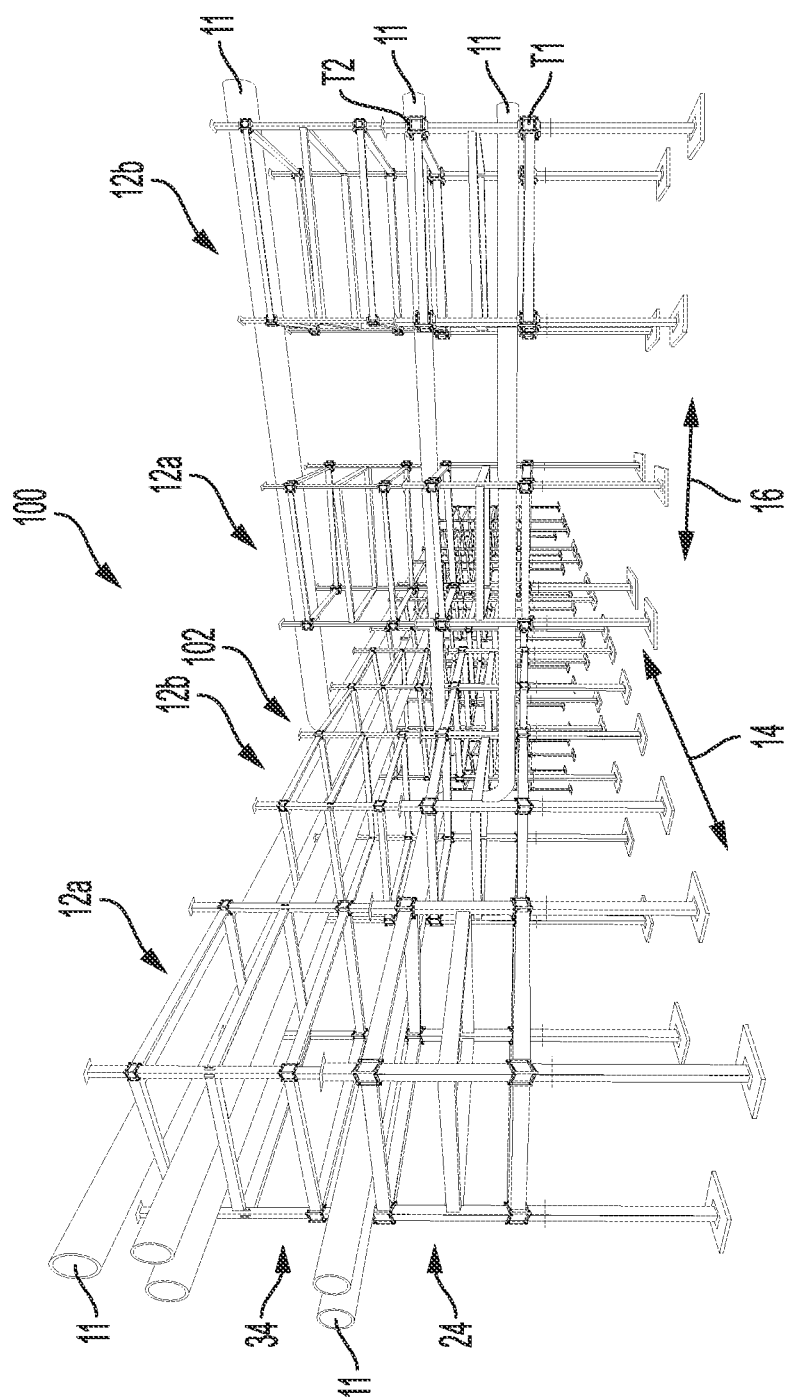
FIG. 10 is a perspective view of an exemplary modular pipe rack system supporting a network of pipes.

FIG. 10 shows fluid transport system 100 assembled and supporting pipes 11. The system 100 includes tower structures 12a, 12b, linearly arranged along longitudinal axis 14, and branches of additional series of tower structures 12a, 12b arranged along transverse axis 16. System 100 is easily assembled and disassembled because of its modular configuration. Each tower structure 12 is free standing, self-supporting, and not connected to an adjacent tower structure by any biaxial full moment connections 33. The first and second sections 24, 34, including first and second tiers T1, T2 of tower structures 12, support and facilitate the passage of a plurality of pipes 11. In an example, each of vertical columns 18 in upper or second section 34 of tower structures 12 may have a smaller cross-section than lower or first section 24. At a junction point 102 on longitudinal axis 14, a series of tower structures 12a, 12b branch out along transverse axis 16 to accommodate turnout of pipes 11.

In an example, large pipes are placed at first-tier level T1, including large bore pipes carrying product around a plant as it is processed, and small-bore maintenance pipes for compressed air, water, and chemical additives required to process a product. In some other examples, second-tier T2 may be reserved for electrical conduit, cable trays that carry electrical and signal control cables from power plant and control room to various pieces of equipment in processing plants.

Concrete-filled column sections (CFC) may be used as vertical columns 18 to provide additional strength and stiffness to overall tower structure 12. Transverse beams 28 connected to vertical columns 18 through moment connections 33 or 37 may have the same nominal depth as longitudinal beams 30. A reduced beam section of transverse or longitudinal beams 28, 30 may be used as a special moment frame (SMF). SMFs are designed to ensure a beam-to-vertical column connection stability is maintained in all conditions.

Figure 11A:
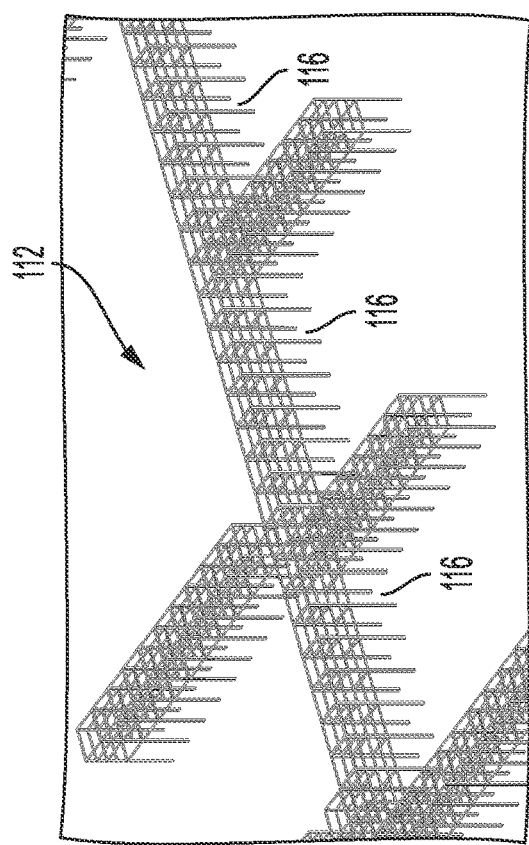
FIG. 11A is a schematic view of a conventional pipe rack support system.
Figure 11B:
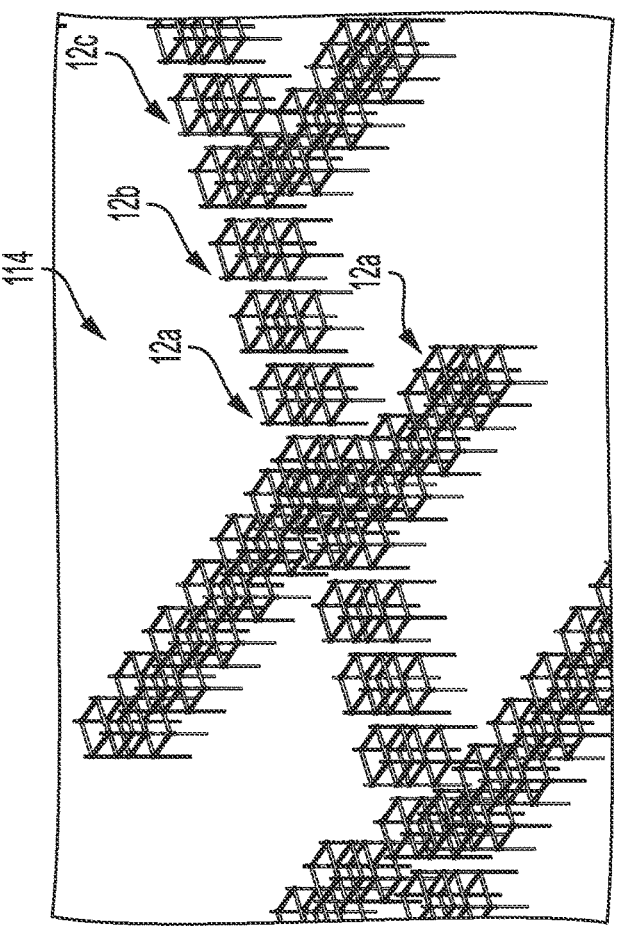
FIG. 11B is a schematic view of a modular tower-based pipe rack support system.

FIGS. 11A and 11B illustrate a fluid transport network 112 to transport fluid from a source to multiple destinations according to a conventional system in comparison to fluid transport system 114 described in the present disclosure, respectively. As seen in FIG. 11A, the conventional system network 112 includes braced bay area 116 connecting framing structure at regular intervals to provide strength to the overall structure. Fluid transport system network 114, including a fluid transport system 100, is self-stabilized, does not require any inter bay bracing. For example, a series of tower structures, spaced 6M apart, may be approximately ¹⁄₁₀th of the stiffness of a single 7-bay conventional braced frame with chevron braces in the middle bay. Tower structures 12 are spaced apart and are unconnected to adjacent tower structure 12, yet are robust and efficient in supporting a plurality of pipes for fluid transport. Hence network 114, including fluid transport system 100 as shown in FIG. 11B requires a reduced amount of material for building fluid transport network 114 over wide, uneven land terrains, and provides much more flexibility for adapting to non-orthogonal directional changes. The modular tower-based example shown in FIG. 11b also provides a superior manufacturing approach by standardizing all basic tower components, with customization being carried out mainly by positioning of the towers and plugging in gravity connecting beams where appropriate.

Figure 12:
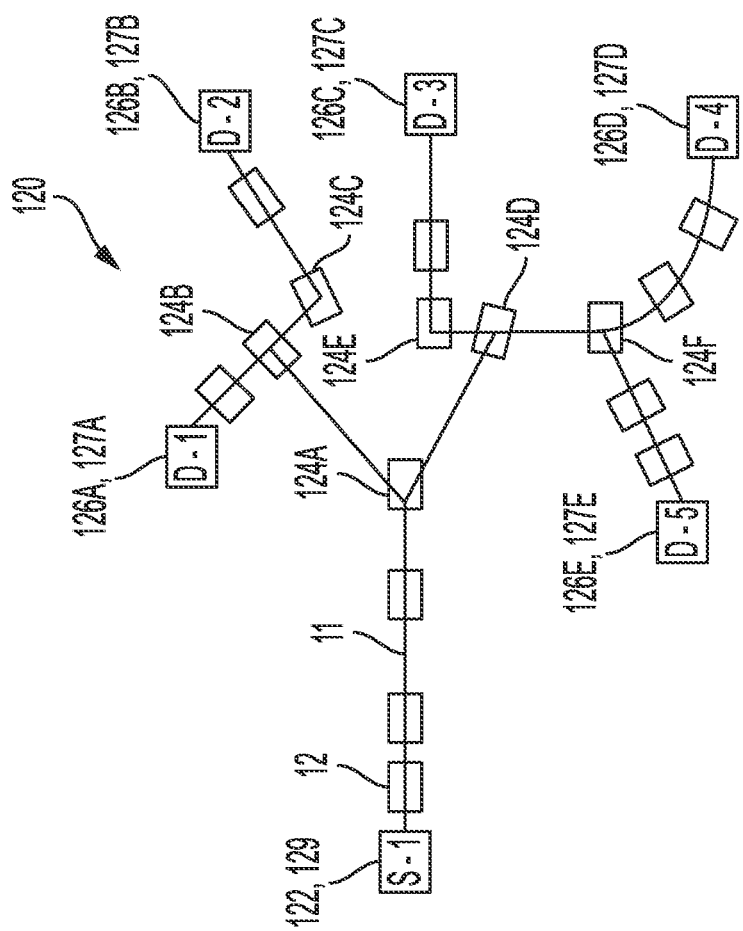
FIG. 12 is an exemplary plan view of a pipe support system including a network of individual towers of FIG. 1

FIG. 12 is an exemplary schematic illustrating a plan view of a master pipe support system 120, including a network of individual towers 12 mapped to connect a source 122 to various destinations 126A-E. Adjacent towers 12 may have different lateral spacing and alignment (lengthwise, breadthwise, or cornerwise), and may be arranged to support linear or nonlinear pipes 11 diverging to different directions. Junction points 124A-F are configured to receive angled connectors (right, obtuse, acute-angled, or any varied angled connector) to serve as diverging points. In other examples, source 122 and destinations 126A-E may be interchanged to design a converging network, whereby a plurality of sources 127A-E may transport fluid to a common destination 129 by a converging network with junction points 124A-F serving as converging points.

Pipe racks undergo complex combinations of stress/forces from multiple directions, for example from: (a) pipe weight, (b) dynamic forces from fluid flow through pipes, (c) wind, and (d) seismic events, among other forces. Therefore, pipe racks must be designed to withstand gigantic multi-directional loads compared to other types of racks and scaffolding that are used for other purposes. In accordance with the current disclosure, a four vertical corner column (8×8 box columns) tower with two tiers of four moment connected beams can support 500 ton of weight subjected to code level wind and seismic load. The same four leg tower with 12-inch columns can support 2000 ton under the same conditions. The same four leg tower with 16-inch columns can support up to 6000 ton.

Illustrative Combinations and Additional Examples

This section describes additional aspects and features of apparatus and methods for fluid transport systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. An apparatus for supporting one or more pipes, comprising:
a first tower, and
a second tower, each tower including four vertical columns, a first set of horizontal beams, each beam spanning and connecting two of the vertical columns via biaxial moment connecting collars, wherein none of the columns in the first tower is connected to a column of the second tower by a biaxial moment connecting collar, the towers being aligned to support a first pipe on beams from both towers along a primary pipe support axis.

A1. The apparatus of A, wherein each tower has a second set of horizontal beams, each beam of the second set of horizontal beams spanning and connecting two of the vertical columns via biaxial moment connecting collars, the first set of horizontal beams forming a first pipe support tier, and the second set of horizontal beams forming a second pipe support tier above the first pipe support tier.

A2. The apparatus of A1, wherein the second pipe support tier is at least six feet above the first pipe support tier.

A3. The apparatus of A1, further comprising:
an auxiliary horizontal beam spanning one of the four vertical columns of the first tower and one of the four vertical columns of the second tower, wherein the auxiliary horizontal beam is connected to the vertical columns by gravity catch devices.

A4. The apparatus of A3, wherein the auxiliary horizontal beam is positioned between the first pipe support tier and the second pipe support tier.

A5. The apparatus of any of A-A4, wherein each of the vertical columns has a rectangular cross section.

A6. The apparatus of any of A-A5, wherein each of the horizontal beams is an I-beam.

A7. The apparatus of any of A-A6, wherein each of the vertical columns has a lower section and an upper section, the upper section having a smaller cross-section than the lower section.

A8. The apparatus of any of A-A7, further comprising:
a first pipe section configured to carry fluid along a primary fluid transmission axis spanning the first and second towers, wherein the first pipe section is supported by beams from each of the first and second towers, perpendicular to the primary fluid transmission direction.

A9. The apparatus of any of A-A8, further comprising:
a cable, each column having an upper section, the cable connecting upper sections of at least two of the vertical columns of the first tower.

A10. The apparatus of any of A-A9, further comprising:
a cable, each column having an upper section, the cable connecting the upper section of a vertical column of the first tower with the upper section of a vertical column of the second tower.

A11. The apparatus of any of A-A10, wherein each of the vertical columns is mounted on a concrete footing positioned at the same elevation.

B An apparatus for supporting one or more pipes, comprising:
a first tower, and
a second tower, each tower including four vertical columns connected by a closed beam assembly via biaxial moment connection collars, the closed beam assembly forming a first pipe support tier along a primary pipe support axis spanning both of the first and second towers, wherein none of the columns in the first tower is connected to a column of the second tower by a biaxial moment connecting collar.

B1. The apparatus of B, wherein the first and second towers have no connection except for a pipe supported by the first support tier configured to carry fluid parallel to the primary pipe support axis.

C. A fluid transport system, comprising:
a series of towers stationed along a transport path, each tower including four tubular columns, and a first rectangular closed beam assembly connected to the columns via biaxial moment connection devices, wherein adjacent towers do not share beams connected by biaxial moment connection devices, and
a continuous pipe passing through the towers along the transport path, the pipe being fastened to the first rectangular closed beam assembly.

C1. The system of C, further comprising:
a second rectangular closed beam assembly connected to the columns via biaxial moment connection devices.

C2. The system of C1, wherein the second rectangular closed beam assembly is at least 4M above the first closed beam assembly.

C3. The system of any of C-C2, wherein each column is supported by a concrete foundation, wherein the first rectangular closed beam assembly is at least 5M above the respective foundation.

C4. The system of any of C-C3, further comprising:
a beam connected to adjacent towers by shear connection devices.

C5. The system of any of C-C4, wherein each tower has a width of at least 4M.

C6. The system of any of C-C5, wherein each tower has an uppermost rectangular closed beam assembly that is free of moment connections.

C7. The system of any of C6, wherein the uppermost rectangular closed beam assembly is no more than 5M above the highest moment connection devices.

C8. The system of any of C-C7, wherein the first rectangular closed beam assembly is a lowest closed beam assembly of a plurality of rectangular beam assemblies, the first rectangular closed beam assembly being a first distance from a foundation of the respective tower and a highest closed beam assembly of the plurality of rectangular beam assemblies is a second distance from a top pipe support tier, the first distance being approximately twice the second distance.

C9. The system of any of C8, wherein adjacent beam assemblies of the plurality of rectangular beam assemblies are spaced by no more than approximately the first distance.

C10. The system of any of C8, wherein adjacent beam assemblies of the plurality of rectangular beam assemblies are spaced by at least half the first distance.

C11. The system of any of C-C10, wherein each tower has a height and a spacing distance from an adjacent tower, the height of the tower being no more than approximately four times the spacing distance.

C12. The system of any of C-C11, wherein each of the four tubular columns has a column width and the rectangular closed beam assembly includes an I-beam having a flange width and a beam depth, the flange width being less than or equal to the column width and the beam depth being greater than or equal to the column width.

C13. The system of any of C-C12, wherein each tower has a longitudinal dimension approximately parallel to the transport path and a spacing distance from an adjacent tower, the longitudinal dimension being approximately equal to the spacing distance.

C14. The system of any of C-C13, wherein each tower has a transverse dimension orthogonal to the longitudinal dimension, the transverse dimension being between half and twice the longitudinal dimension.

C15. The system of any of C-C14, wherein each of the columns has a first inner side equipped with multiple gravity catch devices for securing a beam between adjacent columns at a selected elevation via shear connections.

D. A fluid transport system, comprising:
a series of free-standing towers, each tower including four tubular columns, and a first rectangular closed beam assembly, wherein the first rectangular closed beam assembly includes four structural beams, each structural beam being connected to two of the tubular columns by biaxial moment connection devices, and
a pipe supported by the towers, configured to carry fluid along a path horizontally over the ground.

D1. The system of D, wherein each column is supported by a concrete foundation.

D2. The system of any of D or D1, wherein the first rectangular closed beam assembly is at least 4M above the respective foundation.

E. A fluid transport system, comprising:
a series of free-standing towers, each tower including four tubular columns, and a plurality of rectangular beam assemblies, each tower having a lower section including beam assemblies connected to columns by biaxial moment connection devices, and an upper section including beam assemblies connected by shear connection devices.

E1. The system of E, wherein an upper most first rectangular closed beam assembly is no more than 5M above the highest biaxial moment connection device.

E2. The system of any of E or E1, each of the upper and lower sections have at least two rectangular beam assemblies.

F. A modular fluid transport system, comprising
a plurality of self-stabilized towers securely mounted along a primary fluid transport path, wherein at least a majority of the towers are free standing and disconnected from each other except for one or more pipes running continuously along the primary fluid transport path.

F1. The system of F, further including a node on the primary fluid transport line, wherein a secondary branch, including the linear arrangement of towers, extends from the node.

F2. The system of F1, wherein the secondary branch is orthogonal to the primary line.

F3. The system of any of F-F2, wherein each of the tower includes four columns having a square hollow cross section, the four columns being connected by a first pair of longitudinal and a first pair of transverse beams to define a first pipe tier above a ground level.

F4. The system of any of F-F3, wherein the tower includes a second pair of longitudinal and a second pair of transverse beams to define a second pipe tier above or below the first pipe tier.

F5. The system of F4, wherein the first pair of longitudinal beams are connected to the columns by biaxial moment connections.

F6. The system of any of F4 or F5, wherein the first pair of transverse beams are connected to the columns by biaxial moment connections.

G. A modular pipe rack system, comprising:
a set of self-supporting tower modules aligned along a fluid transport path, each tower module including:
(a) four corner columns, and
(b) four I-beams connected to the corner columns by biaxial moment connection collars forming a first pipe support tier.

G1. The modular pipe rack system of G, wherein each self-supporting tower module is capable of withstanding at least 100,000 pounds of forces exerted on the tower module from any and all directions.

G2. The modular pipe rack system of G, wherein each self-supporting tower module is capable of withstanding at least 1 million pounds of forces exerted on the tower module from any and all directions.

G3. The modular pipe rack system of G, wherein each self-supporting tower module is capable of withstanding at least 4 million pounds of forces exerted on the tower module from any and all directions.

G4. The modular pipe rack system of any of G-G3, wherein each corner column has a rectangular cross-section, two adjacent internal sides and two adjacent external sides, each biaxial moment connection collar connecting a pair of the four I-beams only to the adjacent internal sides of the respective column.

G5. The modular pipe rack system of any of G-G4, wherein each tower has at least two tiers of biaxial moment connected beam assemblies.

G6. The modular pipe rack system of any of G-G5, wherein the four corner columns are lower corner columns of a first rack section, further comprising:
a second rack section extending upward from the first rack section, including four upper corner columns mounted respectively on upper ends of the lower corner columns, wherein the upper corner columns have smaller cross-sectional diameters than the lower corner columns.

G7. The modular pipe rack system of any of G-G6, wherein each of the corner columns has two inner faces and two outer faces, and at least one gravity catch structure mounted on each of the inner and outer faces of each corner column.

G8. The modular pipe rack system of any of G-G7, further comprising:

a main pipe section supported on the first pipe support tier of each self-supporting tower module.

Advantages, Features, and Benefits

The different embodiments and examples of the fluid transport systems described herein provide numerous advantages over known structural solutions for pipe support systems for transporting fluids over the ground. For example, illustrative embodiments and examples described herein allow precise designing of pipe support system configurations, and assembly adaptable to various industrial applications.

Additionally, and among other benefits, illustrative embodiments and examples described herein allow for building robust free-standing tower structures on uneven land terrains.

Additionally, examples described herein accessorize system assembly by allowing usage of standard modular factory-fabricated tower assemblies, which can be safely transported, assembled, accessorized, disassembled, and/or reconfigured, recycled and/or re-used.

Additionally, examples described herein allow speedy, safe assembly and inherently brace-free design, significantly simplifying assembly of the tower structure and equipment installation.

Additionally, examples described herein allow optimization of materials, enabling construction of high performance lighter, greener structures.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application, Such claims, whether broader, narrower, equal, or different in scope to the original claims, also are regarded as included within the subject matter of the present disclosure.

What is claimed is:

1. A modular pipe rack system, comprising:
a set of self-supporting tower modules aligned along a non-linear fluid transport path, each tower module including:
 (a) exactly four vertical columns, and
 (b) four I-beams connected to the vertical columns by biaxial moment connection collars forming a first pipe support tier, wherein each of the biaxial moment connection collars connects exactly two I-beams to one of the four vertical columns,
wherein lateral spacing and relative alignment between tower modules varies along the non-linear fluid transport path.

2. The modular pipe rack system of claim 1, wherein each vertical column has a rectangular cross-section, two adjacent internal sides and two adjacent external sides, each biaxial moment connection collar connecting the respective two of the four I-beams only to the adjacent internal sides of the respective column.

3. The modular pipe rack system of claim 1, wherein each tower has at least two tiers of biaxial moment connected beam assemblies.

4. The modular pipe rack system of claim 1, wherein the four vertical columns are lower corner columns of a first rack section, further comprising:
a second rack section extending upward from the first rack section, including four upper corner columns mounted respectively on upper ends of the lower corner columns, wherein the upper corner columns have smaller cross-sectional diameters than the lower corner columns.

5. The modular pipe rack system of claim 1, wherein each of the vertical columns has two inner faces and two outer faces, and at least one gravity catch structure is mounted on each of the inner and outer faces of each vertical column.

6. The modular pipe rack system of claim 1, further comprising:
a main pipe section supported on the first pipe support tier of each self-supporting tower module.

7. An apparatus for supporting one or more pipes, comprising:
a first tower,
a second tower, and
a third tower,
wherein:
 each tower includes four vertical columns, a first set of horizontal beams, each beam spanning and connecting two of the vertical columns via biaxial moment connecting collars,
 none of the columns in the first tower is connected to a column of the second tower by a biaxial moment connecting collar,
 the first and second towers are aligned to support a first pipe on beams from both towers along a longitudinal axis,
 the third tower is aligned to support a turnout of the first pipe along a transverse axis,
 the turnout of the first pipe is supported by an auxiliary horizontal beam connected to one of the four vertical columns of the first tower by a gravity catch shear connection.

8. The apparatus of claim 7, wherein each tower has a second set of horizontal beams, each beam of the second set of horizontal beams spanning and connecting two of the vertical columns via biaxial moment connecting collars, the first set of horizontal beams forming a first pipe support tier, and the second set of horizontal beams forming a second pipe support tier above the first pipe support tier.

9. The apparatus of claim 7, wherein the auxiliary horizontal beam spans from the first tower to one of the four vertical columns of the second tower, wherein the auxiliary horizontal beam is connected to the vertical column of the second tower by a gravity catch shear connection.

10. The apparatus of claim 9, wherein each tower has a second set of horizontal beams, each beam of the second set of horizontal beams spanning and connecting two of the vertical columns via biaxial moment connecting collars, the first set of horizontal beams forming a first pipe support tier, and the second set of horizontal beams forming a second pipe support tier above the first pipe support tier, and the auxiliary horizontal beam is positioned between the first pipe support tier and the second pipe support tier.

11. The apparatus of claim 7, further comprising:
a first pipe section configured to carry fluid along a primary fluid transmission axis spanning the first and second towers, wherein the first pipe section is supported by beams from each of the first and second towers, perpendicular to the primary fluid transmission direction.

12. The apparatus of claim 7, further comprising:
a cable, each column having an upper section, the cable connecting upper sections of at least two of the vertical columns of the first tower.

13. The modular pipe rack system of claim 1, wherein each of the four vertical columns is a rectangular corner column having a first pair of next-adjacent tower connecting end faces and a second pair of next-adjacent terminal end faces.

14. The modular pipe rack system of claim 1, wherein each biaxial moment connection collar is a dead-end collar, which is configured to be connected to beams on only two sides.

15. The modular pipe rack system of claim 14, wherein each biaxial moment connection collar includes a pair of beam end connecting flange assemblies, and a pair of beam end non-connecting flange assemblies.

16. The modular pipe rack system of claim 1, wherein at least one of the self-supporting tower modules is a junction point including angled connectors to support converging or diverging pipes.

17. The apparatus of claim 7, wherein:
the auxiliary horizontal beam is connected to a second one of the four vertical columns of the first tower by a gravity catch shear connection,
the auxiliary horizontal beam is parallel the longitudinal axis, and
the first and third tower are aligned to support the turnout of the first pipe on the auxiliary horizontal beam and a horizontal beam of the third tower, along the transverse axis.

* * * * *